(12) United States Patent
Watson (10) Patent No.: US 6,293,055 B1
(45) Date of Patent: Sep. 25, 2001

(54) COMBINED BED AND SHELTER DEVICE

(76) Inventor: Dale D. Watson, 672 Glen Ivy Dr., Elgin, IL (US) 60120

( * ) Notice: Subject to any disclaimer, the term of this patent is extended or adjusted under 35 U.S.C. 154(b) by 0 days.

(21) Appl. No.: 09/517,936

(22) Filed: Mar. 3, 2000

Related U.S. Application Data (60) Provisional application No. 60/144,238, filed on Jul. 19, 1999.

(51) Int. Cl.[7] .................................................. A47C 19/22
(52) U.S. Cl. ................................. 52/20; 52/36.4; 52/98; 52/167.1; 52/169.6; 52/173.1; 5/2.1
(58) Field of Search .......................... 52/20, 79.12, 79.1, 52/169.6, 167.1, 98, 36.4; 5/2.1

(56) References Cited

U.S. PATENT DOCUMENTS

| | | | |
|---|---|---|---|
| 780,815 | * 1/1905 | Roberson | 5/2.1 |
| 1,413,593 | * 4/1922 | Kreuzkamp | 5/58 |
| 1,859,912 | * 5/1932 | Brooker | 5/308 |
| 2,607,047 | * 8/1952 | Posey | 109/23 |
| 3,083,979 | * 4/1963 | Boyd | 280/78 |
| 4,126,972 | * 11/1978 | Silen | 52/34 |
| 4,258,516 | 3/1981 | Mori et al. . | |
| 4,489,810 | * 12/1984 | Curtis | 187/3 |
| 4,490,864 | * 1/1985 | Wicker | 52/167 |
| 4,631,038 | * 12/1986 | Ritter | 441/80 |
| 4,763,869 | 8/1988 | Nakamura et al. . | |
| 4,779,294 | * 10/1988 | Miller | 248/165 |
| 4,782,541 | 11/1988 | Tuchman . | |
| 4,941,640 | 7/1990 | Nakamura et al. . | |
| 4,965,895 | 10/1990 | Shuston . | |
| 5,111,543 | * 5/1992 | Epshetsky | 52/167 |
| 5,575,024 | * 11/1996 | You | 52/167.1 |
| 5,615,424 | 4/1997 | Nakata . | |
| 5,878,449 | 3/1999 | Belenky et al. . | |
| 5,956,907 | * 9/1999 | Martin | 52/169.1 |
| 5,979,128 | * 11/1999 | Parsons | 52/169.6 |
| 6,151,738 | * 11/2000 | Arr | 5/2.1 |
| 6,151,841 | * 11/2000 | Green | 5/2.1 |
| 6,161,345 | * 12/2000 | Hope | 52/169.6 |

* cited by examiner

Primary Examiner—Robert Canfield
(74) Attorney, Agent, or Firm—David J. Archer (57) ABSTRACT

A combined bed and shelter device is disclosed. The device is anchored through a plurality of parallel spaced joists to a base for protecting a user in the event of a natural disaster or the like. The device includes a housing defining an enclosure of generally rectangular configuration, the housing including a container having a floor defining a peripheral edge and a wall extending angularly relative to the peripheral edge. A lid is pivotally secured to the container and cooperates with the wall such that the container and the lid define therebetween the enclosure for occupancy by the user in the event of the disaster. A mattress is supported by the lid such that when the lid is disposed in a first location thereof, the mattress supported by the lid serves as the bed for the user thereof and when the lid is disposed in a second location thereof with the lid pivoted about the container, access to the enclosure is permitted so that protection of the user within the enclosure is afforded.

17 Claims, 7 Drawing Sheets

COMBINED BED AND SHELTER DEVICE

This invention claims benefit of provisional Application No. 60/144,238 filed Jul. 19, 1999.

FIELD OF THE INVENTION

The present invention relates to a combined bed and shelter device. More specifically, the present invention relates to a combined bed and shelter device which provides a sleeping facility under normal conditions while providing a life saving shelter in the event of a natural disaster such as a tornado.

Tornados are potentially life threatening phenomena that occur as a result of rapid changes in atmospheric conditions. A tornado may be up to one half mile in diameter and the funnel of a tornado generates air velocities of up to 300 mph. Clearly, a tornado is a life threatening situation and a conventional house is not usually strong enough to withstand the tremendous forces that are unleashed during such a disaster. Many conventional houses are built with basements which provide a degree of protection from the effects of a tornado so that when a tornado strikes, the house is swept away while those seeking refuge in the basement without windows sometimes survive.

Nevertheless, due to the ever increasing cost of building houses, many families do not have the resources to build a house with a basement. Furthermore, many persons live in manufactured homes which include a plurality of parallel spaced joists for supporting a floor which is spaced from a concrete base. Many disasters have occurred in which a tornado strikes a manufactured home park and in such cases, few have survived the ordeal.

The present invention seeks to overcome the aforementioned disadvantage of dwellers of manufactured homes and houses built on concrete slabs without basements by the provision of a bed which also serves as a shelter in the event of a tornado or the like.

Therefore, it is a primary feature of the present invention to provide a combined bed and shelter that will protect the user thereof in the event of a tornado or the like natural disaster.

Other objects and advantages of the present invention will be readily apparent to those skilled in the art by a consideration of the detailed description contained herein taken in conjunction with drawings of a preferred embodiment of the invention.

SUMMARY OF THE INVENTION

The present invention relates to a combined bed and shelter device. The device is anchored through a plurality of parallel spaced joists to a base for protecting a user in the event of a natural disaster or the like. The device includes a housing defining an enclosure of generally rectangular configuration, the housing including a container having a floor defining a peripheral edge and a wall extending angularly relative to the peripheral edge. A lid is pivotally secured to the container and cooperates with the wall such that the container and the lid define therebetween the enclosure for occupancy by the user in the event of the disaster. A mattress is supported by the lid such that when the lid is disposed in a first location thereof, the mattress supported by the lid serves as the bed for the user thereof and when the lid is disposed in a second location thereof with the lid pivoted about the container, access to the enclosure is permitted so that protection of the user within the enclosure is afforded.

In a more specific embodiment of the present invention, the housing is fabricated from a material sufficiently strong enough to deflect projectiles and debris occasioned by the natural disaster. Also, the housing further includes a support for supporting the lid when the lid is disposed in the second location thereof.

The support includes a rod having a first and a second end, the first end being pivotally secured to the lid, the second end of the rod engaging the wall so that the lid is maintained in the second location thereof until the user is safely located and protected within the enclosure.

The housing further includes a latch for latching the lid to the container during occupancy of the enclosure by the user, the latch being releasable from within the enclosure.

The latch includes a latch rod supported by the lid and extending within the lid along a side of the lid opposite to the lid hinge. A further latch rod is supported by the wall and within the container such that the further latch rod and the latch rod are disposed parallel and adjacent relative to each other. Three latches are pivotally secured to the further latch rod, the latches each defining a slot which cooperates with the latch rod when the lid is closed. The arrangement is such that when the latch rod is disposed within the slots by pivoting the latches about the further latch rod, the lid is securely located and latched relative to the container. However, when the latches are pivoted about a longitudinal axis of the further latch rod, the latch rod is disengaged from the slots so that the lid may be released from the container. An access opening is provided in the vicinity of the handle so that the lid may be opened from the outside of the container.

The floor defines a plurality of apertures disposed adjacent to the peripheral edge thereof and the shelter device further includes a plurality of anchors, each anchor of the plurality of anchors cooperating with an aperture of the plurality of apertures so that the anchors rigidly secure the floor of the housing to the base.

Each of the anchors extends through a joist of the plurality of joists and the device in a preferred embodiment of the present invention is disposed within a manufactured home.

The combined bed and shelter device includes a plurality of sections disposed between the joists and the base, each section being rigidly secured to an adjacent section with at least one of the sections being secured to the base and at least another one of the sections being secured to one of the anchors. A fastener is provided for securing the adjacent sections together.

The fastener includes a bolt, a nut and a bevel washer. The nut threadably cooperates with the bolt for fastening the adjacent sections together and the bevel washers are provided for enhancing the fastening of adjacent sections.

Each of the anchors is a tie bolt which extends through one of the apertures of the floor, through one of the joists and through one of the sections for anchoring the floor to the one of the sections.

Each of the joists defines at least one bore for the reception therethrough of the anchor. The at least one bore is in fluid communication with a further bore disposed angularly relative to the at least one bore and a bonding agent is applied through the further bore when the anchor is disposed within the at least one bore so that structural integrity of the joist is maintained.

A plurality of support blocks is disposed on the base such that the sections are disposed between the blocks with one row of blocks on one side of the sections and another row of blocks disposed on the other side of the sections. An I-beam is disposed between the blocks and the joists such that the joists are supported relative to the base by the blocks and the I-beam.

Each of the joists defines a point of weakness disposed directly above the I-beam so that in the event of the natural disaster, the joists break away around the device while the device remains firmly anchored to the base.

Preferably, the point of weakness is a saw cut or any means which would allow the floor joist to break away at two designated locations. A deflecting rod is secured along an edge of the I-beam so that in the event of the I-beam breaking away together with the joists, the deflecting rod slides past the lid without dislodging the lid from the container.

In another embodiment of the present invention, the device is disposed within a conventional home built on a concrete slab.

Each of the anchors are anchored into the concrete slab so that the floor of the container is firmly anchored to the concrete slab.

Many variations and modifications of the present invention will be readily apparent to those skilled in the art by a consideration of the detailed description contained hereinafter taken in conjunction with the annexed drawings. However, such modifications and variations fall within the spirit and scope of the present invention as set forth in the appended claims.

BRIEF DESCRIPTION OF THE DRAWINGS

Similar reference characters refer to similar parts throughout the various embodiments of the present invention.

DETAILED DESCRIPTION OF THE INVENTION

Figure 1:
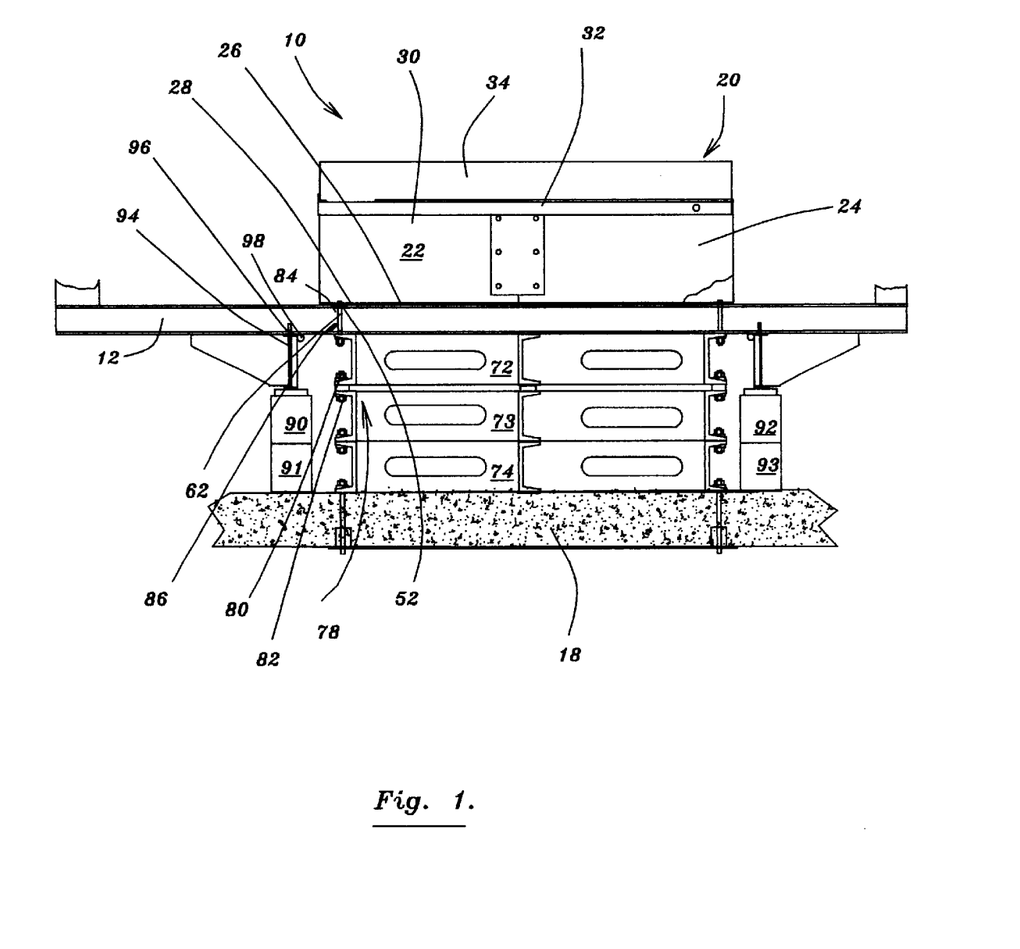
FIG. 1 is a side elevational view of a combined bed and shelter device according to the present invention.

FIG. 1 is a side elevational view of a combined bed and shelter device generally designated 10 according to the present invention.

Figure 2:
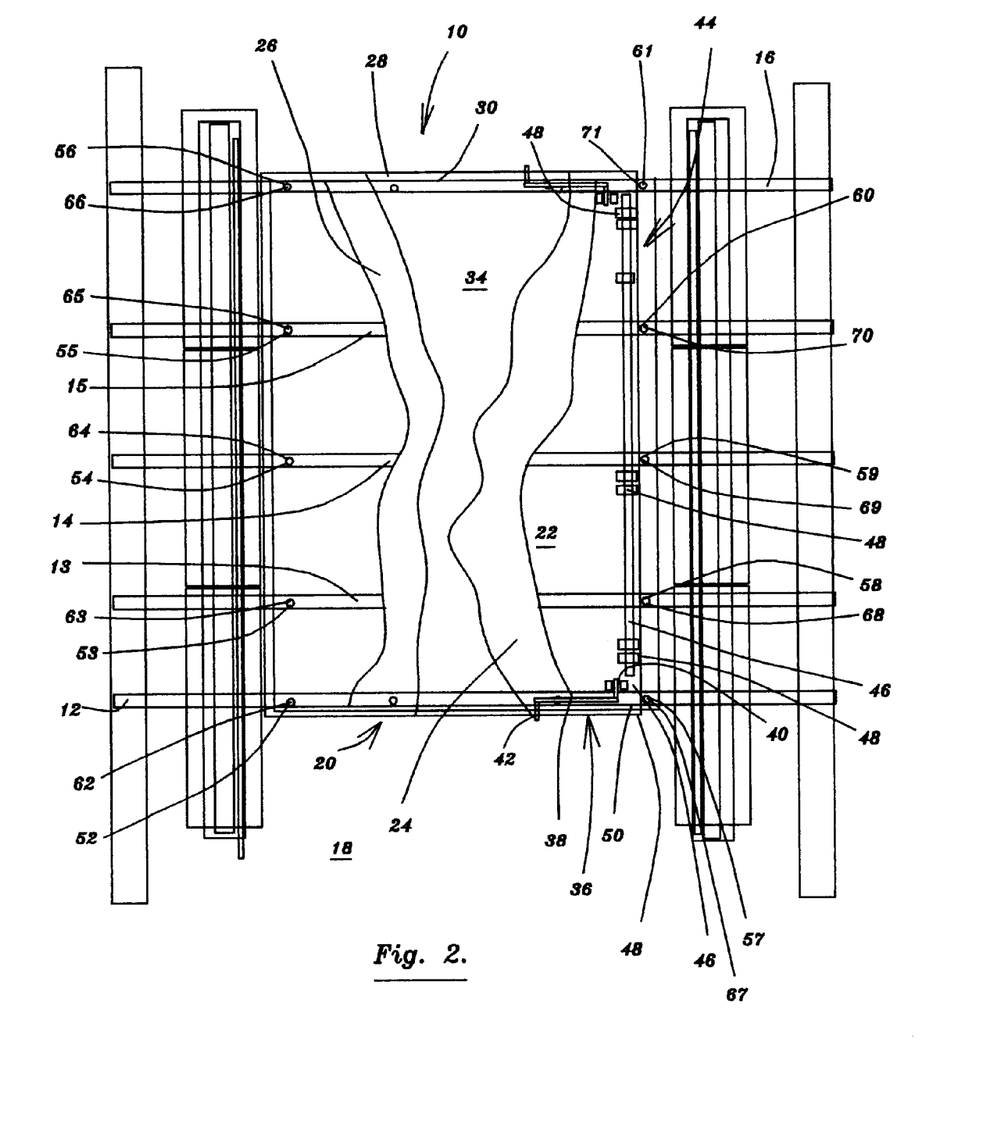
FIG. 2 is a top plan view of the device shown in FIG. 1.

FIG. 2 is a top plan view of the device 10 shown in FIG. 1. As shown in FIG. 2, the device 10 is anchored through a plurality of parallel spaced joists 12, 13, 14, 15 and 16 to a base 18 as shown in FIG. 1, for anchoring the device 10 in the event of a natural disaster or the like. The device 10 includes a housing generally designated 20 defining an enclosure 22 of generally rectangular configuration, the housing 20 including a container 24 having a floor 26 defining a peripheral edge 28 and a wall 30 extending angularly relative to the peripheral edge 28. A lid 32 is pivotally secured to the container 24 and cooperates with the wall 30 such that the container 24 and the lid 32 define therebetween the enclosure 22 for occupancy by the user in the event of the disaster. A mattress 34 is supported by the lid 32 such that when the lid 32 is disposed in a first location thereof as shown in FIGS. 1 and 2, the mattress 34 supported by the lid 32 serves as the bed for the user thereof.

Figure 3:
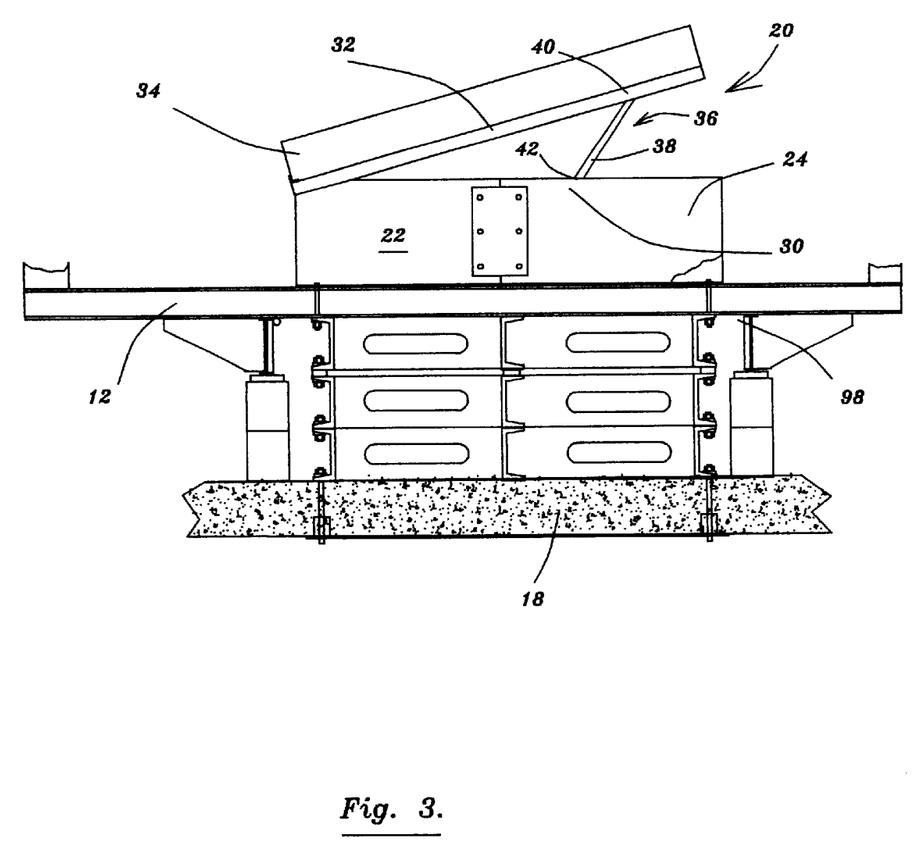
FIG. 3 is a similar view to that shown in FIG. 1 but with the lid in the opened second location thereof.

FIG. 3 is a similar view to that shown in FIG. 1 but shows the lid 32 disposed in an open second location thereof with the lid 32 pivoted about the container 24 such that access to the enclosure 22 is permitted so that protection of the user within the enclosure 22 is afforded.

In a more specific embodiment of the present invention, the housing 20 is fabricated from a material sufficiently strong enough to deflect projectiles and debris occasioned by the natural disaster. As shown in FIG. 3, the housing 20 further includes a support generally designated 36 for supporting the lid 32 when the lid 32 is disposed in the second location thereof.

The support 36 located at each end includes a rod 38 having a first and a second end 40 and 42 respectively, the first end 40 of the rod 38 being pivotally secured to the lid 32, the second end 42 of the rod 38 engaging the wall 30 so that the lid 32 is maintained in the second location thereof until the user is safely located and protected within the enclosure 22.

As shown in FIG. 2, the housing 20 further includes a locking mechanism or latch generally designated 44 for locking the lid 32 to the container 24 during occupancy of the enclosure 22 by the user, the locking mechanism 44 being releasable from within the enclosure 22 as described later with reference to FIG. 9.

As shown in FIG. 2, the floor 26 defines a plurality of apertures such as apertures 52, 53, 54, 55, 56, 57, 58, 59, 60 and 61 disposed adjacent to the peripheral edge 28 thereof. In a preferred embodiment of the present invention, there are a total of fourteen holes. The shelter device 10 further includes a plurality of anchors 62, 63, 64, 65, 66, 67, 68, 69, 70 and 71 each anchor such as 62 of the plurality of anchors 62–71 cooperating with an aperture such as aperture 52 of the plurality of apertures 52–61 so that the anchors 62–71 rigidly secure the floor 26 of the housing 20 to the base 18. Each anchor such as anchor 62 of the anchors 62–71 extends through a joist such as joist 12 of the plurality of joists 12–16.

The device 10 in a preferred embodiment of the present invention as shown in FIGS. 1–3 is disposed within a manufactured home.

As shown in FIG. 1, the combined bed and shelter device 10 includes a plurality of sections 72, 73 and 74 disposed between the joists 12–16 and the base 18, each section such as section 72 being rigidly secured to an adjacent section such as section 73 with at least one of the sections such as section 74 being secured to the base 18 and at least another one of the sections such as section 72 being secured to one of the anchors such as anchor 62. A fastener generally designated 78 is provided for securing the adjacent sections such as sections 72 and 73 together.

The fastener 78 includes a bolt 80, bevel washer and a nut 82 which threadably cooperates with the bolt 80 for fastening the adjacent sections 72 and 73 together.

Each of the anchors 62–71 is a tie bolt which extends through one of the apertures 52–61 of the floor 26, through one of the joists 12–16 and through one of the sections 72–74 for anchoring the floor 26 to section 72 as shown in FIG. 1.

Each of the joists such as joist 12 define at least one bore 84 for the reception therethrough of the anchor 62. The at least one bore 84 is in fluid communication with a further bore 86 disposed angularly relative to the at least one bore 84 and a bonding agent 88 is applied through the further bore 86 when the anchor 62 is disposed within the at least one bore 84 so that structural integrity of the joist 12 is maintained.

As shown in FIG. 1, a plurality of support blocks 90, 91, 92 and 93 is disposed on the base 18 such that the sections 72–74 are disposed between the blocks 90, 91 and 92, 93 with the blocks 90, 91 forming a row of blocks on one side of the sections 72–74 and 92, 93 forming another row on the opposite side of the sections 72–74. An I-beam 94 is disposed between the blocks 90, 91 and the joists 12–16 such that the joists 12–16 are supported relative to the base 18 by the blocks 90, 91 and the I-beam 94.

Each of the joists such as joist 12 defines a point of weakness 96 disposed directly above the I-beam 94 so that in the event of the natural disaster, the joists 12–16 break away around the device 10 while the device 10 remains firmly anchored to the base 18.

Preferably, the point of weakness 96 is a saw cut having a depth of approximately 1.5 inches or a series of small drilled holes running vertically to the joist which would also allow the floor joist to break away at a designated location. A deflecting rod 98 and adjacent plate are secured along an edge of the I-beam 94 so that in the event of the I-beam 94 breaking away together with the joists 12–16, the deflecting rod 98 slides past the lid 32 without dislodging the lid 32 from the container 24. The adjacent plate keeps the bottom lip of the I-beam 94 from catching the lid 32.

Figure 4:
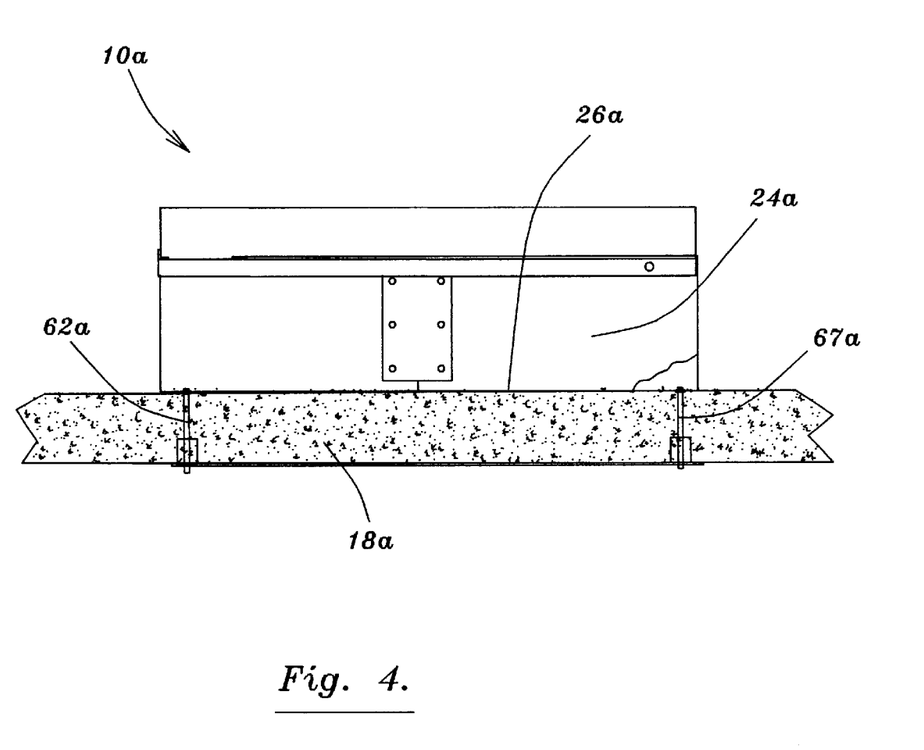
FIG. 4 is a side elevational view of an alternative embodiment of the present invention applied to a home built on a concrete slab.

FIG. 4 is a side elevational view of another embodiment of the present invention. As shown in FIG. 4, the combined bed and shelter device 10a is disposed within a conventional home built on a concrete slab 18a.

Each of the anchors 62a and 67a extend into the concrete slab 18a so that the floor 26a of the container 24a is firmly anchored to the concrete slab 18a.

Figure 5:
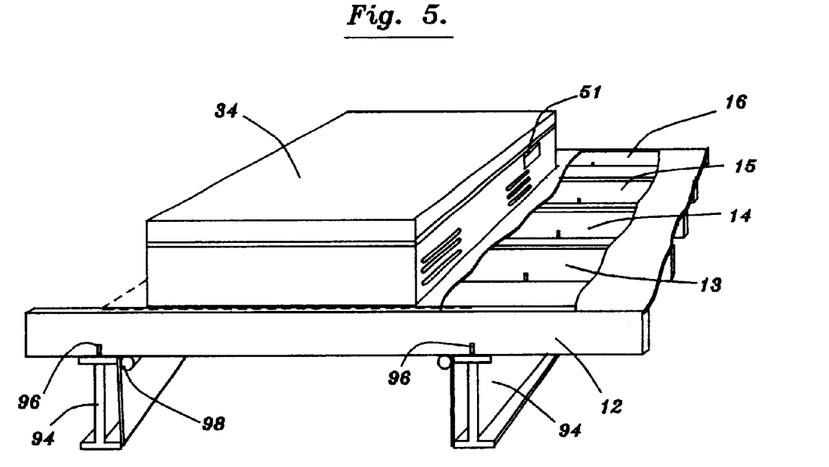
FIG. 5 is a perspective view partially in section of the device shown in FIG. 1.

FIG. 5 is a perspective view partially in section of the device shown in FIG. 1. As shown in FIG. 5, the device is anchored to the joists 12–16, the joists 12–16 being supported by I-beams 94.

Figure 6:
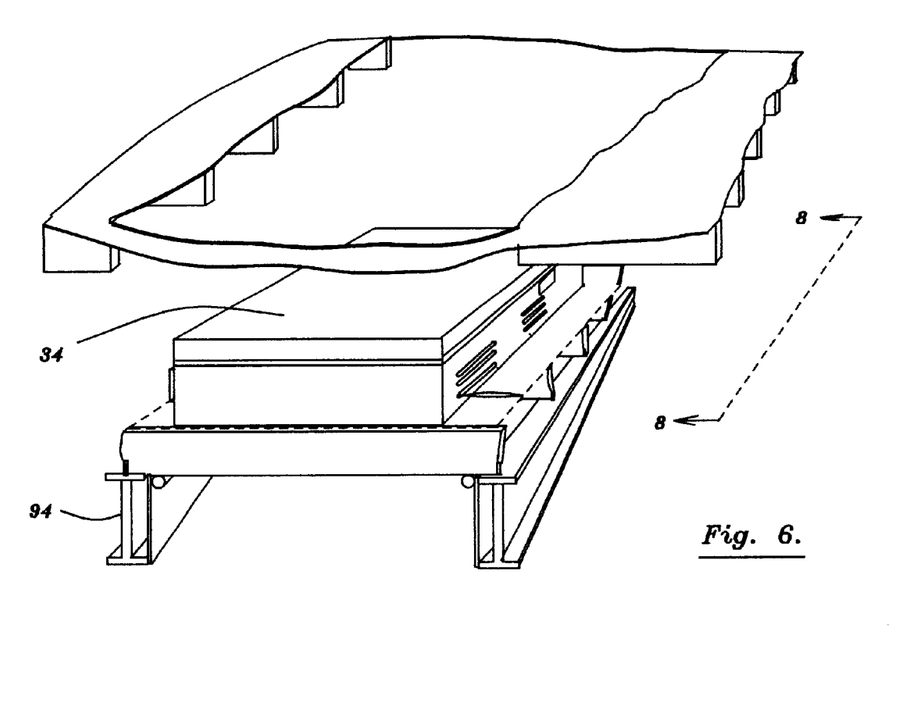
FIG. 6 is a similar view to that shown in FIG. 5 but with the joists and flooring having broken away as a result of the tornado.

FIG. 6 is a similar view to that shown in FIG. 5 but with the joists 12–16 and flooring having broken away as a result of the tornado. However, as shown in FIG. 6, the portions of the joists 12–16 disposed between the saw cuts 96 remain anchored to the base while the remainder of the manufactured home is lifted over and clear of the device by the wind.

Figure 7:
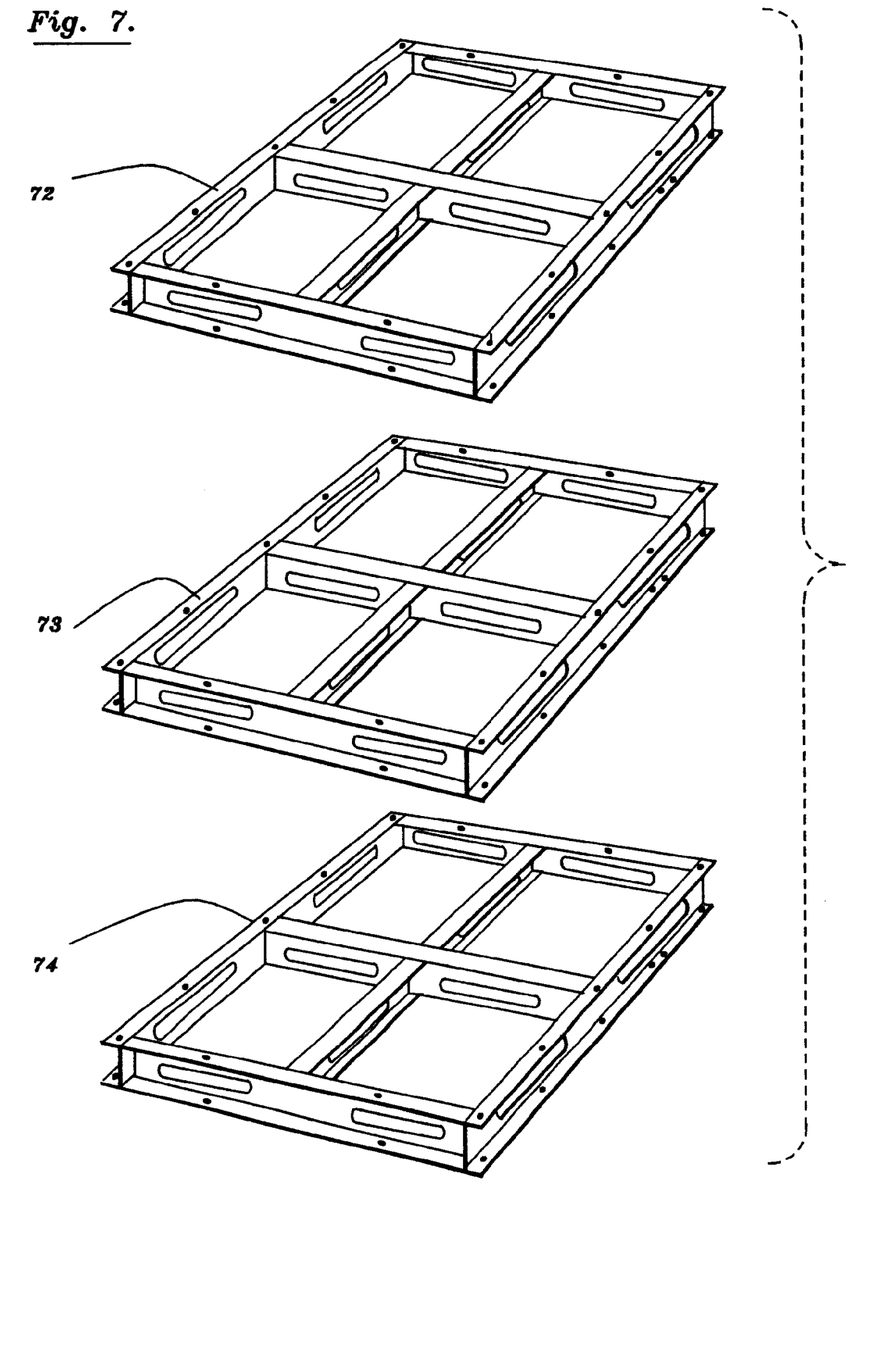
FIG. 7 is an exploded perspective view showing how the sections are arranged and provided with wind vents.

FIG. 7 is an exploded perspective view of the sections 72–74 shown in FIG. 1.

Figure 8:
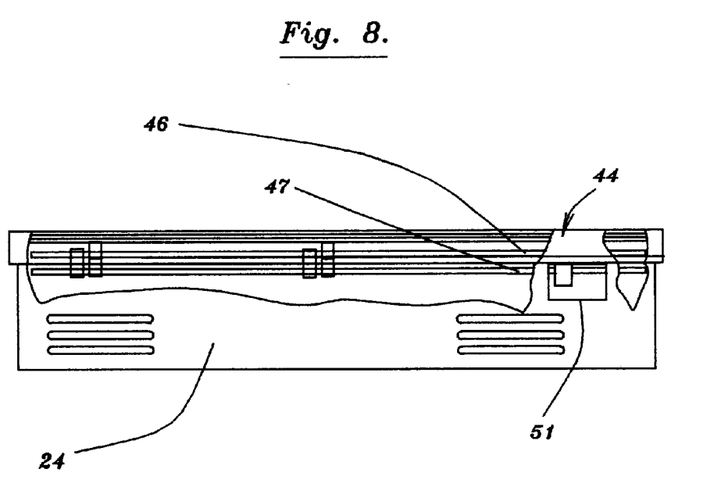
FIG. 8 is a view partially in section taken on the line 8—8 of FIG. 6 showing the latch.

FIG. 8 is a view taken on the line 8—8 of FIG. 6. As shown in FIG. 8, the latch mechanism 44 includes a latch rod 46 and a further latch rod 47. A window 51 is provided for permitting external access to the closure 24.

Figure 9:
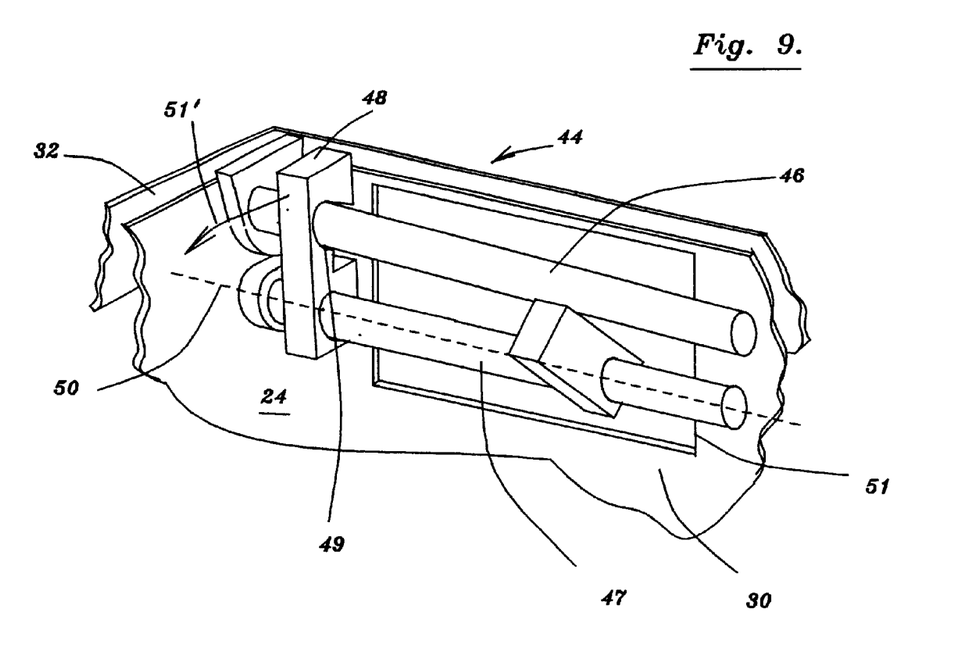
FIG. 9 is an enlarged perspective view partially in section showing details of the latch.

FIG. 9 is an enlarged perspective view partially in section of the locking mechanism or latch generally designated 44. The locking mechanism 44 includes the latch rod 46 supported by the lid 32 and extending within the lid 32 along a side of the lid 32 opposite to the lid hinge. A further latch rod 47 is supported by the wall 30 and within the container 24 such that the further latch rod 47 and the latch rod 46 are disposed parallel and adjacent relative to each other. Three latches 48 are pivotally secured to the further latch rod 47, the latches 48 each defining a slot 49 which cooperates with the latch rod 46 when the lid 32 is closed. The arrangement is such that when the latch rod 46 is disposed within the three slots 49 by pivoting the latches 48 about the further latch rod 47, the lid 32 is securely located and latched relative to the container 24. However, when the three latches 48 are pivoted about a longitudinal axis 50 of the further latch rod 47, as indicated by the arrow 51[1], the latch rod 46 is disengaged from the three slots 49 so that the lid 32 may be released from the container 24. An access opening or window 51 is provided in the vicinity of the latch 48 so that the lid 32 may be opened from the outside of the container 24.

Although many variations of the present invention are possible without departing from the spirit and scope of the invention as claimed, in a preferred embodiment, the lid is fabricated from 5/16" 5052-H32 aluminum alloy with 1"×2" cross braces.

The floor is of 1/4" 5052-H32 aluminum alloy with welded corners. The floor is fabricated in two equal portions to provide maneuverability during construction thereof. The container is lined with 2" foam rubber and is 18" in height by 6' wide by 6'8" in length for supporting a kingsize mattress.

The lid is pivotally secured to the wall by a continuous hinge having a 4" face and holes for receiving 3/8" steel pins.

The anchors for anchoring into the concrete are 1/2" diameter double expansion shield concrete anchors having a rating of 5000 pounds each so that 14 of such anchors will provide 70,000 lbs holding capacity.

The floor joists are 2"×6" and the I-beams are 10" beams with 1" diameter rods 18" in length each welded to the inner upper edge of the respective I-beam. A rubber washer 1/2" in thickness is disposed between the sections such as 72 and 73. Each of the sections defines a wind vent and the bolts for securing adjacent sections are 1/2"×8" in dimensions. Preferably, the sections are 12" ship channels.

The anchors extend through 7/16" diameter bores drilled through the joists and the further bores are disposed at an angle of 45 degrees relative to the bores. Each of the further bores is 1/8" in diameter.

In use of the shelter device, the breakaway floor design includes 1.5" saw cuts at the centerline of the supporting I-beams. Alternatively, a series of small drilled holes running vertically to the joist could be provided which would also allow the floor joist to break away at a designated location. Usually, the flooring will also include 1/2" plywood which would also be cut along the same line and across the ends. The arrangement is such that the wind would lift the flooring from off its frame and, if strong enough, would break the five floor joists at their weakest point to allow the floor to be carried over the top of the tornado safe bed.

The present invention provides a unique device which provides a sleeping facility under normal conditions while providing a life saving shelter in the event of a natural disaster such as a tornado.

What I claim is:
1. A combined bed and shelter device anchored to a base for protecting a user in the event of a natural disaster, said device comprising:
   a housing defining an enclosure of generally rectangular configuration;
   said housing including:
   a container having a floor defining a peripheral edge and a wall extending angularly relative to said peripheral edge;

a lid pivotally secured to said container and cooperating with said wall such that said container and said lid define therebetween said enclosure for occupancy by the user in the event of the disaster;

a matteress supported by said lid such that when said lid is disposed in a first location thereof, said mattress supported by said lid serves as the bed for the user thereof and when said lid is disposed in a second location thereof with said lid pivoted about said container, access to said enclosure is permitted so that protection of the user within said enclosure is afforded;

a plurality of parallel spaced joists;

a plurality of anchors;

each of said anchors extending through a joist of said plurality of joists for anchoring said housing to the base.

2. A combined bed and shelter device as set forth in claim 1 wherein said housing is fabricated from a material for deflecting projectiles and debris occasioned by the natural disaster, said housing further including:

a support for supporting said lid when said lid is disposed in said second location thereof.

3. A combined bed and shelter device as set forth in claim 2 wherein said support includes:

a rod having a first and a second end, said first end being pivotally secured to said lid, said second end of said rod engaging said wall so that said lid is maintained in said second location thereof until the user is safely located and protected within said enclosure.

4. A combined bed and shelter device as set forth in claim 1 wherein said housing further includes:

a latch for latching said lid to said container during occupancy of said enclosure by said user, said latch being releasable from within said enclosure.

5. A combined bed and shelter device as set forth in claim 4 wherein said latch includes:

a latch rod supported by said lid and extending within said lid along a side of said lid;

a further latch rod supported by said wall and within said container such that said further latch rod and said latch rod are disposed parallel and adjacent relative to each other;

a latch pivotally secured to said further latch rod, said latch defining a slot which cooperates with said latch rod when said lid is closed, the arrangement being such that when said latch rod is disposed within said slot by pivoting said latch about said further latch rod, said lid is securely located and latched relative to said container and when said latch is pivoted about a longitudinal axis of said further latch rod, said latch rod is disengaged from said slot so that said lid is released from said container.

6. A combined bed and shelter device as set forth in claim 1 wherein said floor defined a plurality of apertures disposed adjacent to said peripheral edge thereof;

each anchor of said plurality of anchors cooperating with an aperture of said plurality of apertures so that said anchors rigidly secure said floor of said housing to the base.

7. A combined bed shelter device as set forth in claim 1 wherein said device is disposed within a manufactured home.

8. A combined bed and shelter device as set forth in claim 7 further including:

a plurality of sections disposed between said joists and the base, each section being rigidly secured to an adjacent section with at least one of said sections being secured to the base and at least another one of said sections being secured to one of said anchors.

9. A combined bed and shelter device as set forth in claim 8 further including:

a fastener for securing said adjacent sections together.

10. A combined bed and shelter device as set forth in claim 9 wherein said fastener includes:

a bolt;

a nut which threadably cooperates with said bolt for fastening said adjacent sections together.

11. A combined bed and shelter device as set forth in claim 8 wherein each of said anchors is a tie bolt which extends through an aperture defined by said floor, through one of said joists and through one of said sections for anchoring said floor to said one of said sections.

12. A combined bed and shelter device as set forth in claim 8 further including:

a plurality of support blocks disposed on the base for supporting and levelling said manufactured home;

an I-beam disposed between said blocks and the joists such that the joists are supported relative to the base by said blocks and said I-beam;

each of the joists defining a point of weakness disposed directly above said I-beam so that in the event of the natural disaster, the joists break away around said device while said device remains firmly anchored to the base.

13. A combined bed and shelter device as set forth in claim 12 wherein said point of weakness is a saw cut.

14. A combined bed and shelter device as set forth in claim 12 further including:

a deflecting rod secured along an edge of said I-beam so that in the event of said I-beam breaking away together with the joists, said deflecting rod slides past said lid without dislodging said lid from said container;

a plate welded to an inside face of said I-beam so that a lower lip of said I-beam is prevented from catching onto said lid.

15. A combined bed and shelter device anchored to a base for protecting a user in the event of a natural disaster, said device comprising:

a housing defining an enclosure of generally rectangular configuration;

said housing including:

a container having a floor defining a peripheral edge and a wall extending angularly relative to said peripheral edge;

a lid pivotally secured to said container and cooperating with said wall such that said container and said lid define therebetween said enclosure for occupancy by the user in the event of the disaster;

a mattress supported by said lid such that when said lid is disposed in a first location thereof, said mattress supported by said lid serves as the bed for the user thereof and when said lid is disposed in a second location thereof with said lid pivoted about said container, access to said enclosure is permitted so that protection of the user within said enclosure is afforded;

further including:

a plurality of parallel spaced joists;

a plurality of anchors;

each of said joists defining at least one bore for the reception therethough of one of said anchors;

a further bore disposed angularly relative to said at least one bore;

said at least one bore being in fluid communication with said further bore; and a bonding agent applied through said further bore when said anchor is disposed within said at least one bore so that structural integrity of said joist is maintained.

16. A combined bed and shelter device anchored to a base for protecting a user in the event of a natural disaster, said device comprising:

a housing defining an enclosure of generally rectangular configuration;

said housing including:
 a container having a floor defining a peripheral edge and a wall extending angularly relative to said peripheral edge;
 a lid pivotally secured to said container and cooperating with said wall such that said container and said lid define therebetween said enclosure for occupancy by the user in the event of the disaster;
 a mattress supported by said lid such that when said lid is disposed in a first location thereof, said mattress supported by said lid serves as the bed for the user thereof and when said lid is disposed in a second location thereof with said lid pivoted about said container, access to said enclosure is permitted so that protection of the user within said enclosure is afforded;

said device further including:
 a plurality of anchors;
 said device being disposed within a conventional home built on a concrete slab; and
 each of said anchors extending into said concrete slab so that said floor of said container is firmly anchored to said concrete slab.

17. A combined bed and shelter device anchored to a base for protecting a user in the event of a natural disaster, said device comprising:

a housing defining an enclosure of generally rectangular configuration;

said housing including:
 a container having a floor defining a peripheral edge and a wall extending angularly relative to said peripheral edge;
 a lid pivotally secured to said container and cooperating with said wall such that said container and said lid define therebetween said enclosure for occupancy by the user in the event of the disaster;
 a mattress supported by said lid such that when said lid is disposed in a first location thereof, said mattress supported by said lid serves as the bed for the user thereof and when said lid is disposed in a second location thereof with said lid pivoted about said container, access to said enclosure is permitted so that protection of the user within said enclosure is afforded;

said device further including:
 a plurality of parallel spaced joists for supporting said housing;
 a plurality of support blocks disposed on the base
 an I-beam disposed between said blocks and said joists such that said joists are supported relative to the base by said blocks and said I-beam; and
 each of said joists defining a point of weakness disposed directly above said I-beam so that in the event of the natural disaster, said joists break away around said device while said device remains firmly anchored to the base.

* * * * *